United States Patent [19]

Arthen, Jr. et al.

[11] 4,401,585
[45] Aug. 30, 1983

[54] BIS(P-ALKYLPHENYLETHYNYL)ANTHRACENE

[75] Inventors: Frank J. Arthen, Jr., Hunterdon; Robert J. Manfre, Somerville, both of N.J.

[73] Assignee: American Cyanamid Company, Stamford, Conn.

[21] Appl. No.: 341,390

[22] Filed: Jan. 21, 1982

[51] Int. Cl.$^3$ .............................................. C09K 11/07
[52] U.S. Cl. ........................... 252/188.3 CL; 585/25; 585/320; 585/321; 585/422
[58] Field of Search ................ 252/188.3 CL; 585/25, 585/320, 321, 422

[56] References Cited

U.S. PATENT DOCUMENTS

| | | | |
|---|---|---|---|
| 3,557,233 | 1/1971 | Zweig et al. | 252/188.3 CL |
| 3,729,426 | 4/1973 | Zweig et al. | 252/188.3 CL |
| 3,888,786 | 6/1975 | Maulding | 252/188.3 CL |
| 4,076,645 | 2/1978 | Vega | 252/188.3 CL |

*Primary Examiner*—Irwin Gluck
*Attorney, Agent, or Firm*—Gordon L. Hart

[57] ABSTRACT

Bis(p-alkylphenylethynyl)anthracenes are described for use as fluorescer components in chemiluminescent reaction mixtures and in precursor solutions or solid mixtures. Chemiluminescent mixtures comprising these fluorescers are shown to generate higher light capacity and higher quantum yields than those made with similar prior art fluorescers.

7 Claims, No Drawings

BIS(P-ALKYLPHENYLETHYNYL)ANTHRACENE

The invention relates to novel fluorescer compounds and to the use of those compounds in mixtures which are useful for generating chemiluminescence and to the use of such mixtures for generating chemiluminescence.

Zweig and Maulding, in U.S. Pat. Nos. 3,557,233 and 3,729,426, and Maulding, in U.S. Pat. No. 3,888,786 described 9,10-bis(phenylethynyl)anthracenes substituted by chloro, bromo, fluoro, or lower alkyl groups and their use as fluorescers with certain oxalictype compounds which react with peroxide to produce chemiluminescence. The invention provides fluorescers for chemiluminescent mixtures that will have higher chemiluminescence efficiencies as measured by the quantum yield, and will have higher light output as measured by the light capacity, than those described by Zweig and Maulding.

SUMMARY OF THE INVENTION

The invention provides novel fluorescer compounds having the formula (I),

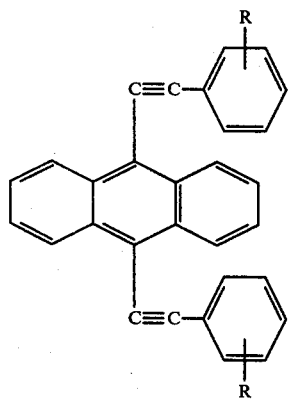

wherein R is selected from the group consisting of $C_4$ to $C_{22}$ alkyl, and $C_4$ to $C_8$ cycloalkyl.

There are also provided novel mixtures for generating chemiluminescence. These mixtures comprise (a) a fluorescer compound of formula (I) above, a chemiluminescent reactant, and a diluent, in proportions and concentrations to produce chemiluminescence when the mixtures are reacted with a peroxide component.

The invention further provides a process for generating chemiluminescence by reacting a mixture of the above composition with a peroxide component.

The fluorescers of the present invention are particularly distinguished from the prior art fluorescers in chemiluminescent mixtures by the fact that mixtures with the new fluorescers provide higher quantum yields, about 15–16%, versus about 9%, for 9,10-bis(phenylethynyl)anthracene, and they provide higher light capacities, about 380–550 lumen-hours per liter, versus about 280 lumen-hours per liter for 9,10-bis(phenylethynyl)anthracene.

Compounds of formula (I) can be prepared by reacting about two molecular proportions of the lithium salt of a selected phenylacetylene with anthraquinone to obtain a dihydrodihydroxybis(phenylethynyl)anthracene, which is then converted to the corresponding 9,10-bis(phenylethynyl)anthracene by methods described in more detail in the Maulding, U.S. Pat. No. 3,911,038).

Illustrative examples of compounds of formula (I) include the following:
9,10-bis(p-n-hexylphenylethynyl)anthracene,
9,10-bis(p-n-octylphenylethynyl)anthracene,
9,10-bis(p-2-ethylhexylphenylethynyl)anthracene,
9,10-bis(p-n-dodecylphenylethynyl)anthracene,
9,10-bis(p-cyclohexylphenylethynyl)anthracene,
9,10-bis(p-n-butylphenylethynyl)anthracene,
and the like.

Presently the most preferred compound of formula (I) for use in chemiluminescent mixtures is 9,10-bis(p-n-octylphenylethynyl)anthracene.

The term "chemiluminescence," as employed herein, is defined as the generation of electromagnetic radiation between about 300 and 1200 nanometers by means of a chemical reaction.

The term "chemiluminescent reactant" is defined as any compound which enters into a chemical reaction with a peroxide component to produce chemiluminescence. The preferred chemiluminescent reactants for use in this invention are oxalic acid esters, and certain oxamides which are described for example in U.S. Pat. Nos. 3,597,362, 3,888,786, and 4,226,738.

The term "composition for reaction with a peroxide component to generate chemiluminerscence," as employed herein, is defined as a mixture of a compound of formula (I) and a chemiluminescent reactant in a diluent in concentrations sufficient to produce chemiluminescence by admixing with a peroxide component. Thus, the initial concentrations of the compound of formula (I), the reactant compound, and the ingredients of the peroxide component in the reaction mixture must be sufficient to produce chemiluminescence.

The term "admixing," as used herein, means "reacting" or sufficiently bringing together component reactants to obtain chemiluminescence.

The fluorescer compound of formula (I) must not readily react with the peroxide component used in this invention, or with the reactant compound, and must be at least partially soluble in the diluent employed.

The composition for reaction with a peroxide component to generate chemiluminescence may comprise a liquid which will solubilize the fluorescer compound of formula (I) and the reactant compound to provide initial concentrations in the reacting system of about $10^{-3}$ M to about 10 M, preferably about $10^{-1}$ M to about 1 M, of the reactant compound and about $10^{-5}$ M to about $10^{-1}$ M, preferably about $10^{-3}$ M to $10^{-2}$ M, of the fluorescer compound. This liquid diluent must be relatively unreactive toward the other ingredients of the chemiluminescent mixture.

The molar concentrations of the reactant compound, and the fluorescer compound in the composition before addition and reaction with the peroxide component is about 1.1–2.5, preferably about 1.2–1.3, times the molar concentrations of the same materials in the reacting system described above.

Typical diluents which can be used in the composition for reaction with a peroxide component include esters, ethers, aromatic hydrocarbons, chlorinated aliphatic and aromatic hydrocarbons such as those described for the use in U.S. Pat. Nos. 3,749,679 and 3,888,786. The most preferred diluent is dibutyl phthalate. Solvent combinations may be used but such combinations, should not include strongly electron donating solvents, strongly acidic, or strongly basic solvents.

The term "diluent," as used herein, is defined as a liquid solvent, or vehicle, for the compound of formula (I) and the reactant compound.

The term "peroxide compound," as used herein, means a solution of a hydrogen peroxide compound, a hydroperoxide compound, or a peroxide compound in a suitable diluent.

The term "hydrogen peroxide compound" includes (1) hydrogen peroxide and (2) hydrogen peroxide-producing compounds.

Hydrogen peroxide is the preferred hydroperoxide and may be employed as a solution of hydrogen peroxide in a solvent or as an anhydrous hydrogen peroxide compound such as sodium perborate, sodium peroxide, and the like. Whenever hydrogen peroxide is contemplated to be employed, any suitable compound may be substituted which will produce hydrogen peroxide.

Diluents which can be employed for the peroxide component include any liquid which is relatively unreactive toward the hydroperoxide, the chemiluminescent reactant, and the fluorescer compound, and which accommodates a solubility to provide at least 0.01 M hydroperoxide solution. Solvents suitable as diluents for the hydroperoxide component include water; alcohols, such as ethanol, tertiary butanol, or octanol; ethers, such as diethyl ether, diamyl ether, tetrahydroduran, dioxane, dibutyldiethyleneglycol, perfluoropropyl ether, and 1,2-di-methoxyethane; and esters, such as ethyl acetate, ethyl benzoate, dimethyl phthalate, dioctylphthalate, propyl formate. Solvent combinations can, of course, be used such as combinations of the above with anisole, tetralin, and chlorobenzene, providing said solvent combination accommodates hydroperoxide solubility. However, strong electron donor solvents such as dimethyl formamide, dimethyl sulfoxide, and hexamethyl-phosphoramide should not, in general, be used as a major diluent for the peroxide component.

The preferred diluent for the peroxide component is a mixture of about 80 volume percent dimethyl phthalate and about 20 volume percent tertiary butanol.

The hydrogen peroxide concentration in the peroxide component may range from about 0.2 M to about 15 M. Preferably, the concentration ranges from about 1 M to about 2 M.

The lifetime and intensity of the chemiluminescent light emitted can be regulated by the use of certain regulators such as:

(1) by the addition of a catalyst which changes the rate of reaction of hydroperoxide with the compound for formula (I). Catalysts which accomplish that objective include those described in M. L. Bender, "Chem. Revs.," Vol. 60, p. 53 (1960). Also, catalysts which alter the rate of reaction or the rate of chemiluminescence include those accelerators of U.S. Pat. No. 3,775,366, and decelerators of U.S. Pat. Nos. 3,691,085 and 3,704,231, or (2) by the variation of hydroperoxide. Both the type and the concentration of hydroperoxide are critical for the purpose of regulation.

Preferably, a weakly basic accelerator, such as sodium salicylate, is included in the peroxide component to control the lifetime of the chemical lighting system. The concentration of weakly basic accelerator used in the peroxide component may range from about $10^{-6}$ M to about $10^{-2}$ M, preferably, from about $10^{-4}$ M to about $10^{-3}$ M.

The initial concentration of the ingredients of the peroxide component in the reacting system is about 0.15 to 0.60 of the concentrations in the peroxide component since the peroxide component comprises about 15 to about 60 volume percent of the reaction mixture.

The concentration of the hydrogen peroxide compound in the chemiluminescent reaction is at least equal to the molar concentration of the chemiluminescent reactant and is preferably 1.2 to 5.0 times the concentration of the chemiluminescent reactant in the reacting system described above. The optimum concentrations must be determined experimentally for each specific system.

The following examples are illustrative of the present invention. All parts are by weight unless otherwise indicated.

EXAMPLE 1

Preparation of 9,10-Bis(p-n-octylphenylethynyl)anthracene

Lithium amide (2.4635 grams; 0.1073 mole), dry dioxane (160 mls), and p-n-octylphenylacetylene (22.22 grams of 90% purity; 0.0933 mole) are added, under a blanket of argon, to a reaction vessel equipped with a thermometer, stirrer, argon inlet, and reflux condenser, and the resulting mixture is heated to 80° C., stirred for 2.5 hours, and then cooled to room temperature. Anthraquinone (9.2077 grams; 0.0442 mole) and additional dry dioxane (50 mls) are added and the resulting mixture is stirred at 100° C. for 56 hours.

The reaction mixture is cooled to 15° C., a solution of stannous chloride dihydrate (33.5 grams) in a mixture of N,N-dimethylformamide (70 mls) and glacial acetic acid (10 mls) is added and the resulting mixture is stirred at 100° C. for 5 hours. The reaction mixture is then cooled to room temperature, stirred for 16 hours, and then cooled to 10° C. Glacial acetic acid (100 mls) and dilute sulfuric acid (100 mls) are added and the resulting mixture is stirred at ambient temperature for one hour.

The reaction mixture is allowed to settle and the supernatant liquor is decanted from a dark brown gummy residue. The residue is triturated with water (200 mls), stirred with the water for 0.5 hour, and allowed to settle. The water is decanted and the residue is dissolved in toluene (400 mls). The resulting solution is filtered and the filtrate is concentrated under vacuum to obtain a dark brown residue. The residue is redissolved in toluene, treated with anhydrous magnesium sulfate, DARCO ® Decolorizing Carbon (ICI Americas, Inc.), and Magnesol* (Trademark, FMC Corporation), and stirred at reflux for one hour while azeotropically removing water by means of a Dean-Stark trap. The hot reaction mixture is then filtered through a bed of diatomaceous earth, and the filtrate is concentrated to dryness to obtain a dark semi-solid. The latter is recrystallized from hexane (120 mls) to obtain 3.2 grams of a yellow crystalline solid, mp 131°–133° C.

Calculated for $C_{46}H_{50}$: C, 91.64%; H, 8.36% Found: C, 90.63%; H, 8.45%.

EXAMPLE 2

Preparation of 9,10-Bis(p-n-dodecylphenylethynyl)anthracene

Lithium amide (1.8712 grams; 0.0815 mole), dry dioxane (135 mls), and p-n-dodecylphenylacetylene (19.14 grams; 0.0708 mole) are added, under a blanket of argon, to a reaction vessel equipped with a thermometer, argon inlet, stirrer, and reflux condenser, and the resulting mixture is heated to reflux, stirred for 2.5 hours, and then cooled to room temperature. Anthraquinone (6.9754 grams; 0.0335 mole) is added and the mixture is heated again and stirred at reflux for 15 hours.

The reaction mixture is cooled to room temperature, a solution of stannous chloride dihydrate, (25.4 grams) in N,N-dimethylformamide (55 mls) is added and the mixture is heated and stirred at 100° C. for 5 hours. The reaction mixture is again cooled and stirred at room temperature for 15 hours. Glacial acetic acid (150 mls) and dilute sulfuric acid (150 mls; 5 N) are then added, followed by addition of warm cyclohexane (400 mls). The reaction mixture is stirred for 30 minutes, then allowed to separate into two phases and the lower layer is removed. The upper layer is dried over anhydrous magnesium sulfate, then treated with DARCO ® carbon and HYFLO ® Super-Cel (Johns-Manville Sales Corporation), and stirred for one hour at ambient temperature. The mixture is then filtered and the filter cake is washed with cyclohexane. The filtrate and washing liquid are combined and the mix is concentrated under vacuum to obtain a brown solid. The solid is slurried in cold isopropanol, filtered, rinsed with cold isopropanol then dried to obtain 8.5 grams of a bright yellow solid. Recrystallization from methylcyclohexane gives a yellow solid which melts at 111°–113° C.

Calculated for $C_{54}H_{66}$: C, 90.70%; H, 9.30%; Found: C, 90.02%; H, 9.35%;

EXAMPLES 3–5

Determination of Chemiluminescence

Solutions of 7.5 mls of bis(6-carbopentoxy-2,4,5-trichlorophenyl)oxalate (CPPO) and selected fluorescers (defined in Table I) are made in dibutyl phthalate. Each solution is mixed with 2.5 mls of a peroxide component which consists of hydrogen peroxide and sodium salicylate in 80% dimethyl phthalate-20% (by volume) tertiary butanol. Each of the chemiluminescent reaction mixtures contains initial concentrations of 0.38 M hydrogen peroxide, $1.56 \times 10^{-4}$ M sodium salicylate, 0.08 M CPPO, and $2.25 \times 10^{-3}$ M of the fluorescer. Quantitative measurements of the chemiluminescence of the solutions are carried out by means of a Hirt-Roberts radiometer-spectrophotometer using the procedure described in the Journal of Organic Chemistry, Volume 44, page 4115 (1979). The results are shown in Table I. The fluorescer compounds of Examples 1 and 2 provided significantly higher light capacities and quantum yields than the comparison fluorescer (Example 3) which was selected because it is a prior art fluorescer of choice for most oxalate ester chemiluminescent compositions.

TABLE I

| Example | Fluorescer | Light Capacity[a] | Percent Quantum Yield[b] | $T_{75}$[c] |
|---|---|---|---|---|
| 3 | Compound of Example 1 | 382 | 15.9 | 94 |
| 4 | Compound of Example 2 | 380 | 15.4 | 69 |
| 5 | 9,10-Bis(phenylethynyl)anthracene | 279 | 12.5 | 53 |

[a]Lumen hours per liter
[b]Einsteins per mole × 100
[c]Time (in minutes) required for 75% of the total light to be emitted

EXAMPLES 6–8

The procedure of Example 3 is followed in all details except varying concentrations of the compound of Example 1, and 0.10 M CPPO are used. The results are shown in Table II.

TABLE II

| Example | Conc. of Fluorescer (M) | Light Capacity | Percent Quantum Yield | $T_{75}$ |
|---|---|---|---|---|
| 6 | 0.00225 | 366 | 12.2 | 101 |
| 7 | 0.00450 | 397 | 12.9 | 76 |
| 8 | 0.00675 | 365 | 11.6 | 110 |

EXAMPLES 9–13

The procedure of Example 3 is followed in every detail except 0.00450 M of the compound of Example 1, and varying concentrations of CPPO were used as shown in Table III. The results are shown in Table III.

TABLE III

| Example | Conc. of CPPO | Light Capacity | Percent Quantum Yield | $T_{75}$ |
|---|---|---|---|---|
| 9 | 0.05 | 235 | 15.2 | 26 |
| 10 | 0.08 | 340 | 13.6 | 87 |
| 11 | 0.10 | 422 | 13.4 | 88 |
| 12 | 0.15 | 546 | 11.5 | 167 |
| 13 | 0.20 | 535 | 8.5 | 150 |

We claim:
1. A composition defined by the formula

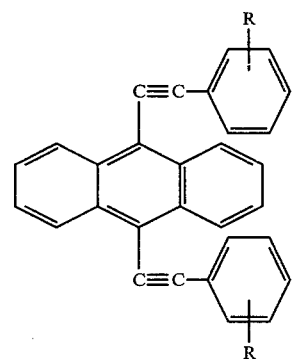

wherein R is selected from the group consisting of $C_4$ to $C_{22}$ alkyl and $C_4$ to $C_8$ cycloalkyl.
2. 9,10-Bis(-p-n-octylphenylethynyl)anthracene.
3. 9,10-Bis(p-n-dodecylphenylethynyl)anthracene.
4. A composition comprising a chemiluminescent reactant and a fluorescer having the composition defined by claim 1.
5. A composition comprising a chemiluminescent reactant and a fluorescer having the composition defined by claim 2.
6. A composition comprising a chemiluminescent reactant and a fluorescer having the composition defined by claim 3.
7. A process for generating chemiluminescence which comprises mixing a composition defined by claim 4 with a peroxide component in diluent to provide concentrations that will produce chemiluminescence.

* * * * *